(No Model.)

C. W. & W. L. WALTERS.
FINANCIAL INSTRUMENT FOR USE OF BANKERS, &c.

No. 555,230. Patented Feb. 25, 1896.

Fig. 1.

Witnesses
J. Landing
Frederick H. Davis

Inventors
Charles W. Walters and William Linn Walters
by Harold Binney
Attorney (No Model.) 2 Sheets—Sheet 2.

C. W. & W. L. WALTERS.
FINANCIAL INSTRUMENT FOR USE OF BANKERS, &c.

No. 555,230. Patented Feb. 25, 1896.

FIG. 2.

Witnesses
J. Landing
Frederick H. Davis

Inventors.
Charles W. Walters & William Linn Walters
by Harold B. Birney
Attorney

United States Patent Office.

CHARLES W. WALTERS AND WILLIAM LINN WALTERS, OF DENVER, COLORADO.

FINANCIAL INSTRUMENT FOR USE OF BANKERS, &c.

SPECIFICATION forming part of Letters Patent No. 555,230, dated February 25, 1896.

Application filed January 25, 1896. Serial No. 576,875. (No model.)

*To all whom it may concern:*

Be it known that we, CHARLES W. WALTERS and WILLIAM LINN WALTERS, of Denver, Colorado, have invented a new and useful Improvement in Financial Instruments for the Use of Bankers, Financial Corporations, and others, of which the following is a description, referring to the accompanying drawings, which illustrate one form of the invention and which form part of this specification.

The nature of our improvement will be clearly understood from its embodiment as designed for use by express or other companies in transacting a financial or banking business. For such application of the invention it consists of a financial instrument or certificate of deposit in duplicate having two alternative receipts upon the back of one of the said duplicates, the instrument and the receipts being so worded that they may have the following functions and effect. For the purposes of this specification the duplicate certificates will be distinguished from each other as the "deposit-certificate" and the "depositor's coupon-certificate." The deposit-certificate is retained by the agent or cashier of the company or bankers issuing it and the depositor's coupon-certificate is retained by the depositor. This latter certificate has upon its back two blank forms of receipt, one of which may signify that the depositor has received in full the total amount of the deposit for which the certificate was issued, and that the deposit-certificate and depositor's coupon-certificate are canceled and marked paid on their face and therefore thereafter null and void, and the other may signify that the depositor has received the amount of money called for by the depositor's coupon-certificate without mention of the deposit-certificate. The function of the latter of these receipts is to permit the depositor to collect the amount through any bank, incorporated express or other financial company. The signature of the depositor is witnessed, and the indorsement of the bank or express company which collects the sum makes such company responsible in case of forgery or fraud to the company that originally issued the certificates. On the other hand, the function of the first-named receipt, which in effect cancels both the deposit-certificate and the depositor's certificate, is to enable the depositor to draw his money from any telegraph or other office of the company that issues the certificate. The signature of the depositor to such receipt, release, and cancellation relieves the company from all further responsibility. To guard against forgery of the signature in this instance, however, identification is required, and the blank contains words to the effect that the personality and signature of the depositor have been identified by a subscribing witness.

The two receipt-blanks upon the rear of one duplicate are separable from each other, and when they are so separated the depositor's coupon-certificate or other financial instrument upon the face of the duplicate is necessarily thereby divided and destroyed. By this capability, therefore, the separation of the receipt which has been signed by the depositor upon repayment of the deposit from the other unsigned receipt, for the purpose of filing or otherwise, will destroy the duplicate instrument on which it is indorsed and prevent its misuse or reissue either by mistake or with intent to defraud the company.

The words of the original contract in duplicate, as contained in the deposit-certificate and in the depositor's coupon-certificate, may be to the effect that when duly issued, signed, and countersigned the company issuing the certificates accepts for deposits and agrees to pay to the depositor named the sum entered in writing upon the face of the certificates, and that the sum may be collected or paid by means of either of the two methods and the two receipts just described. In addition the certificates contain and are expressly issued upon condition that certain necessary details be complied with in collecting the money and in case of loss of the depositor's coupon-certificate. A separate clause, in blank, may be added providing that the amount deposited is to be paid at a certain date and rate of interest. The duplicate certificates are signed by the depositor and the treasurer and are countersigned by the cashier or agent for the company.

One preferred form of the invention as so applied to banking operations is illustrated in the accompanying drawings, though it must not be understood that the invention is in any way limited to the precise wording employed or that it has anything whatever to do with the precise wording employed, for we are well aware that there is no invention in any such details, and this patent is applied for and issued for the duplicate form of certificate and the alternative receipts having novel functions in relation to each other. These functions are of course largely dependent on the meaning of the various parts, but are in no way dependent on the precise form of language.

In the drawings, Figure 1 is a face view of the duplicate instrument; and Fig. 2 is a view of the reverse or back, showing the two indorsed blanks and the line of separation $xx$ between them.

In the figures of the drawings like letters of reference indicate like parts.

The portion marked D is the deposit-certificate, and the portion marked C the coupon or depositor's coupon-certificate. Upon the back C' of this depositor's coupon-certificate C are found the receipts, marked V and R respectively. The former one, properly executed, after identification constitutes a complete cancellation and surrender of both certificates in favor of the company issuing them and a receipt for payment in full. The second one, filled out, merely constitutes a surrender of the depositor's coupon-certificate and a receipt and release in full for the total amount. It is clear from the drawings that the line for separation of these two blanks passes through the text upon the face of the member C of the duplicate upon which they are indorsed. Therefore if one of these blanks be filled out, executed, cut off, and filed the instrument upon which it was indorsed will (in addition to whatever effect the contents of the executed blank may have) be divided and destroyed.

The wording upon the certificates being clearly legible in the drawings, we will not set it forth at length in this specification further than to call attention to the following: The two certificates respectively contain the words "Deposit Certificate" and "Depositor's coupon-certificate," which serve to distinguish them. Preferably, also, the deposit certificate contains the words "Agents and cashiers retain this certificate," or other indications to that effect. In all other respects the two certificates are upon their face identical. Certain details, such as indicating the number and series of the certificate, or otherwise distinguishing various duplicate certificates one from another, but indicating that the duplicate certificates are duplicate originals of a single contract, may be added, as indicated in the drawings. A separate sub-contract, which, when executed, forms an inseparable condition of the contract set forth in the certificate, may read as follows: "It is hereby agreed that this certificate is payable —— months from date with —— interest at —— per cent. per annum from date until maturity. Interest is payable —— annually." There may be a space for separate signature, or the signatures to the complete contract may include this clause when filled out, it being proper in such case to cancel the blanks in this clause when it is not filled out.

We are aware that duplicate instruments of many sorts have been used, and we make no claim to any such broad invention, if invention there be in mere duplication; but We do claim and desire to secure, together with all such modifications as may be in function and effect the same, the following:

1. The financial instrument, substantially as described, consisting of a blank obligation in duplicate and two blanks indorsed upon one member thereof, the said blanks being each complete in itself and separable from the other upon a line passing through the text upon the face of the said member, substantially as set forth.

2. The financial instrument or certificate, substantially as described, consisting of a blank obligation in duplicate and separable, and two blanks indorsed upon one member of the said duplicate, one of the said blanks being a complete and separable receipt and release of the said instrument and the other of said blanks being a receipt; the line of separation between the two members of the said duplicate being clear of the said indorsed receipts and the line of separation between the said indorsed receipts being through the text of one member of the duplicate whereby, when said receipt and release has been separated and filed, the said text is canceled and destroyed, substantially as illustrated and described.

In testimony whereof we have hereunto set our hands, at Denver, Colorado, this 9th day of January, A. D. 1896.

CHARLES W. WALTERS.
W. LINN WALTERS.

In presence of—
F. C. McARTHUR,
ED. LEDWIDGE.